(12) United States Patent
Mochizuki et al.

(10) Patent No.: US 9,643,477 B2
(45) Date of Patent: May 9, 2017

(54) VEHICLE INTERIOR STRUCTURE

(71) Applicant: Nissan Motor Co., Ltd., Kanagawa (JP)

(72) Inventors: Haruka Mochizuki, Kanagawa (JP); Wataru Suzuki, Kanagawa (JP); Takashi Mukaiyama, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/768,523

(22) PCT Filed: Dec. 20, 2013

(86) PCT No.: PCT/JP2013/084216
§ 371 (c)(1),
(2) Date: Aug. 18, 2015

(87) PCT Pub. No.: WO2014/129074
PCT Pub. Date: Aug. 28, 2014

(65) Prior Publication Data
US 2015/0375603 A1   Dec. 31, 2015

(30) Foreign Application Priority Data

Feb. 19, 2013   (JP) .................................. 2013-029922

(51) Int. Cl.
*B60J 3/00*   (2006.01)
*B60R 21/02*   (2006.01)

(52) U.S. Cl.
CPC ............. *B60J 3/007* (2013.01); *B60R 21/026* (2013.01)

(58) Field of Classification Search
CPC ................................. B60J 3/007; B60R 21/026
USPC ........................................................ 296/24.46
See application file for complete search history.

(56) References Cited

U.S. PATENT DOCUMENTS

| 6,217,096 B1 * | 4/2001 | Koiwa ................. B60N 2/3011 296/24.43 |
| 2004/0164582 A1 * | 8/2004 | Swift ........................ B60N 2/24 296/66 |
| 2011/0042989 A1 * | 2/2011 | Heller .................. A01K 1/0272 296/24.46 |

FOREIGN PATENT DOCUMENTS

| JP | 3109663 U | 5/2005 |
| JP | 2009-046104 A | 3/2009 |
| JP | 3150255 U | 5/2009 |

* cited by examiner

*Primary Examiner* — Joseph D Pape
*Assistant Examiner* — Dana Ivey
(74) *Attorney, Agent, or Firm* — Osha Liang LLP (57) ABSTRACT

A vehicle interior structure has a driver's seat disposed inside a cabin, a rear passenger's seat disposed on a vehicle rear side of the driver's seat inside the cabin, and a partition panel arranged along a vehicle width direction between the driver's seat and the rear passenger's seat. The partition panel has a bulging section bulging toward a vehicle front side.

2 Claims, 7 Drawing Sheets

VEHICLE INTERIOR STRUCTURE

CROSS-REFERENCE TO RELATED APPLICATIONS

This application is a national stage application of PCT/JP2013/084216 filed on Dec. 20, 2013, and claims priority to Japanese Patent Application No. 2013-029922 filed on Feb. 19, 2013, the entire contents of which are incorporated herein by reference.

BACKGROUND

Technical Field

The present invention relates to a vehicle interior structure.

Related Art

For crime prevention of a vehicle such as a taxi, a technique has been known in which a partition panel is provided along the vehicle width direction between a driver's seat and rear passenger's seats behind the driver's seat (see Patent Literature 1). Clear polycarbonate, for example, has been widely used to this partition panel.

Patent Literature 1: Japanese Patent Application Publication No. 2009-46104

SUMMARY

Here, the partition panel made of polycarbonate mentioned above acts to reflect part of light incident on the surface thereof. For this reason, there is a possibility that light from the tail lamp of a vehicle ahead is reflected on the surface of the partition panel toward the front and may appear on a rear-view mirror in the cabin and the driver may feel disturbed by the light.

One or more embodiments of the claimed invention provides a vehicle interior structure which reduces light appearing on a rear-view mirror after being reflected on the surface of a partition panel.

One or more embodiments of the present invention provides a vehicle interior structure in which a partition panel is arranged along the vehicle width direction behind a driver's seat, and the partition panel is provided with a bulging section bulging toward the vehicle front side.

One or more embodiments of the present invention provides a vehicle interior structure in which a partition panel is arranged along the vehicle width direction behind a driver's seat, and the partition panel is provided with an inclining portion inclining with respect to the vehicle vertical direction such that the inclining portion becomes closer to the vehicle front side as extending downward.

DETAILED DESCRIPTION

Hereinbelow, embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Note that in the drawings, FR, RR, UPR, and LWR denote the front side, rear side, upper side, and lower side of a vehicle, respectively. Moreover, the following embodiments will describe cases where the present invention is applied to a vehicle such as a taxi in which passengers sit in the rear seats, for example. However, the present invention is not limited to such a vehicle.

First Embodiment

First, a first embodiment of the present invention will be described.

Figure 1:
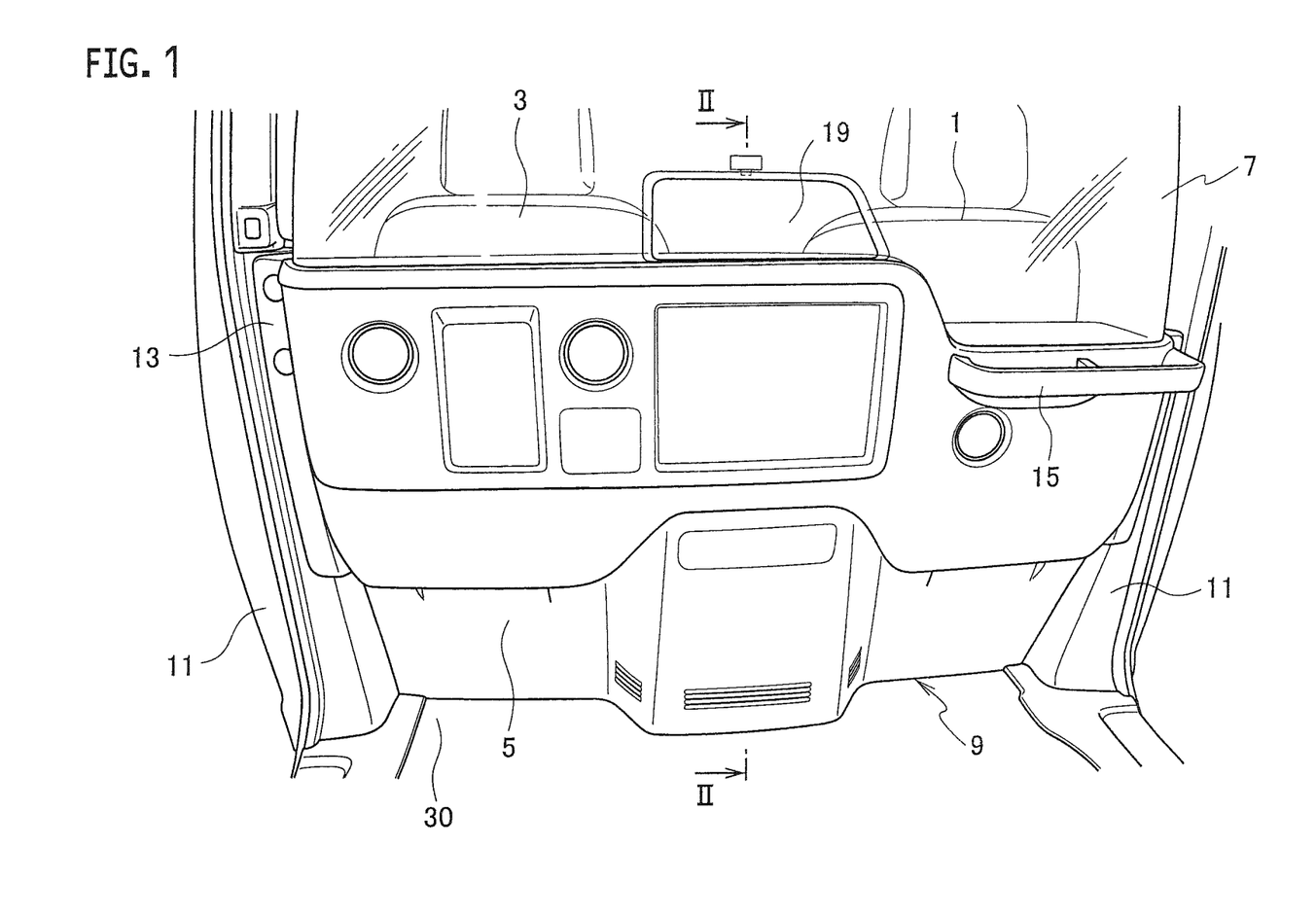
FIG. 1 is a perspective view of a partition according to a first embodiment of the present invention as seen from the vehicle rear side.

As shown in FIG. 1, in a front area of a cabin, a driver's seat 1 is arranged on the right side, and a front passenger's seat 3 is arranged to the left of the driver's seat 1. Rear passenger's seats 4 (see FIGS. 3 and 5) are arranged on the vehicle rear side of the driver's seat 1 and the front passenger's seat 3. A partition 9 including a partition wall member 5 and a partition panel 7 is arranged along the vehicle width direction between the driver's seat 1 and the rear passenger's seats 4. By separating the driver's seat 1 and front passenger's seat 3 from the rear passenger's seats 4 with the partition 9, vehicle interior structure exhibits a function of preventing crime in the vehicle such as a taxi.

Specifically, at left and right end areas in the vehicle width direction, a pair of left and right center pillars 11 extend in the vertical direction, respectively, and the partition wall member 5 extends in the vehicle width direction and connects these center pillars 11 and 11 to each other. More specifically, flange sections 13 protruding outward in the vehicle width direction are formed at both left and right ends of the partition wall member 5, and the flange sections 13 are coupled to the corresponding center pillars 11. Note that a fare receiving part 15 is provided on the rear side (rear passenger's seats 4 side) of a right end portion of the partition wall member 5. Fare and change are given and received between the driver and the passenger through this fare receiving part 15.

Figure 2:
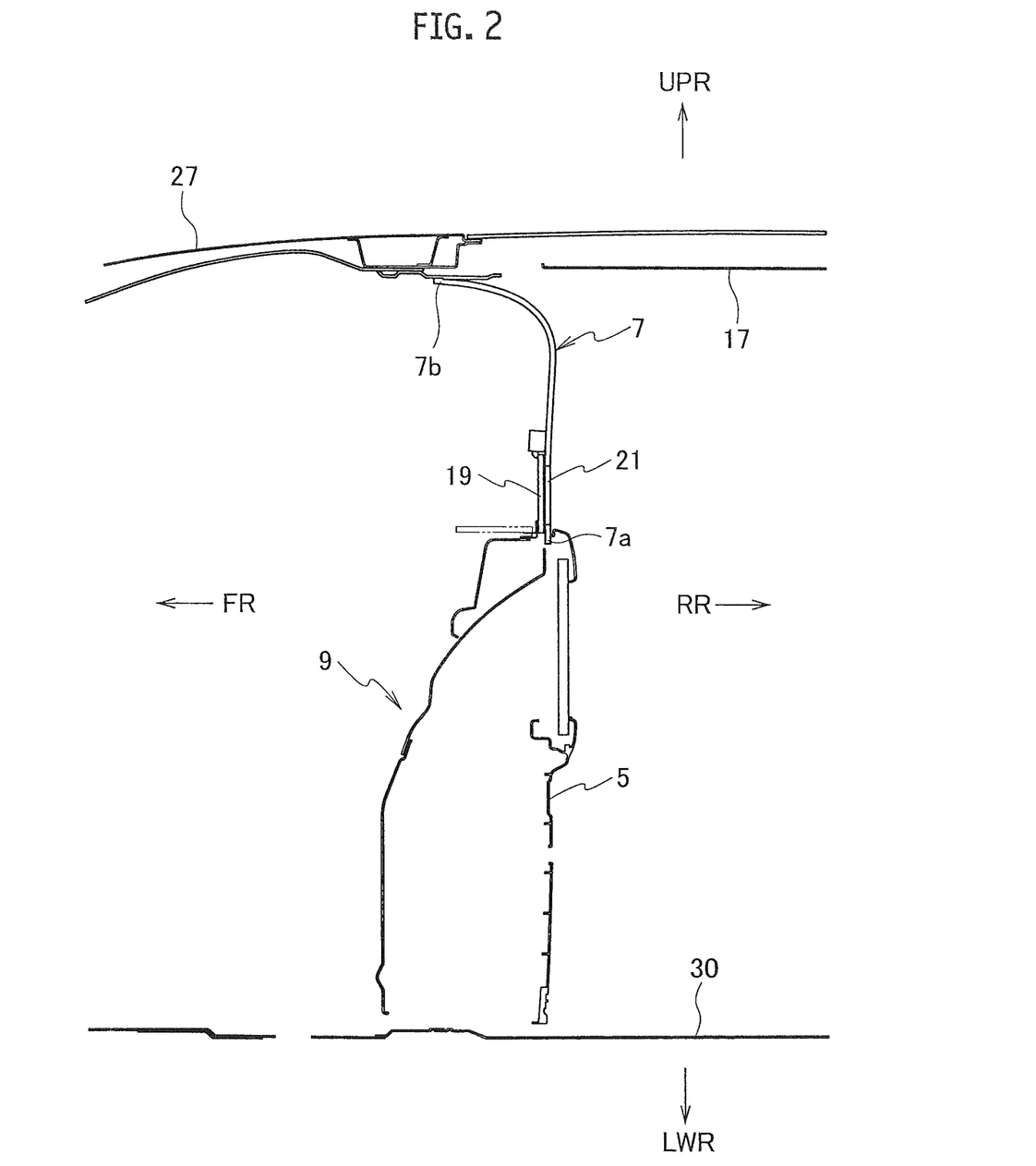
FIG. 2 is a cross-sectional view taken along line II-II in FIG. 1.

Moreover, the partition panel 7 made of clear polycarbonate is arranged along the vehicle width direction on top of the partition wall member 5. As shown in FIG. 2, a lower end portion 7a of the partition panel 7 is coupled to the upper end of the partition wall member 5, and an upper end portion 7b of the partition panel 7 is coupled to a ceiling interior member 17. Moreover, an openable-closable window 19 having a substantially rectangular shape in a front view is provided in a lower portion of a center section of the partition panel 7 in the vehicle width direction. This openable-closable window 19 is configured to be capable of opening and closing an opening portion 21 formed in the partition panel 7, and has an angular range of approximately 90° between the vehicle front side and the vehicle upper side as a range within which the openable-closable window 19 can turn about a lower end portion thereof. By opening the openable-closable window 19, small articles such as a map can be given and received between the driver and the passenger through the opening portion 21. Note that a floor panel 30 is arranged under the partition wall member 5.

Figure 3:
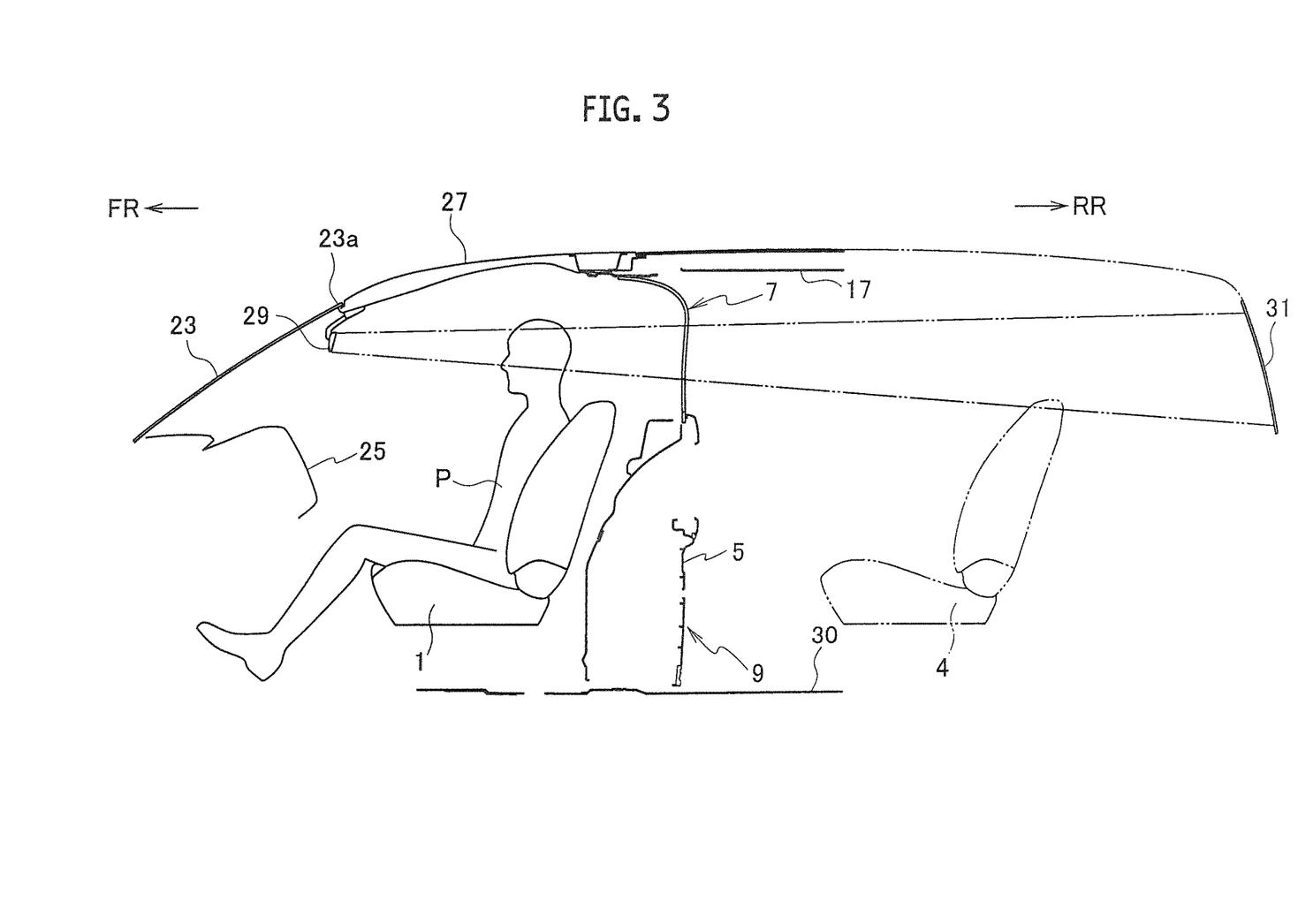
FIG. 3 is a schematic side view showing the range of vision of the driver through a rear-view mirror.

As shown in FIG. 3, a front windshield 23 extends obliquely upwardly toward the rear from a vicinity of the front end of an instrument panel 25, and an upper end portion 23a thereof is supported on the front end of a roof 27. Moreover, a rear-view mirror 29 is arranged inside the cabin at the front end of the roof 27. Thus, as shown by two-dot chain lines, a driver P sitting in the driver's seat 1 can visually see the vehicle rear side through the clear partition panel 7 and a rear windshield 31.

Figure 4:
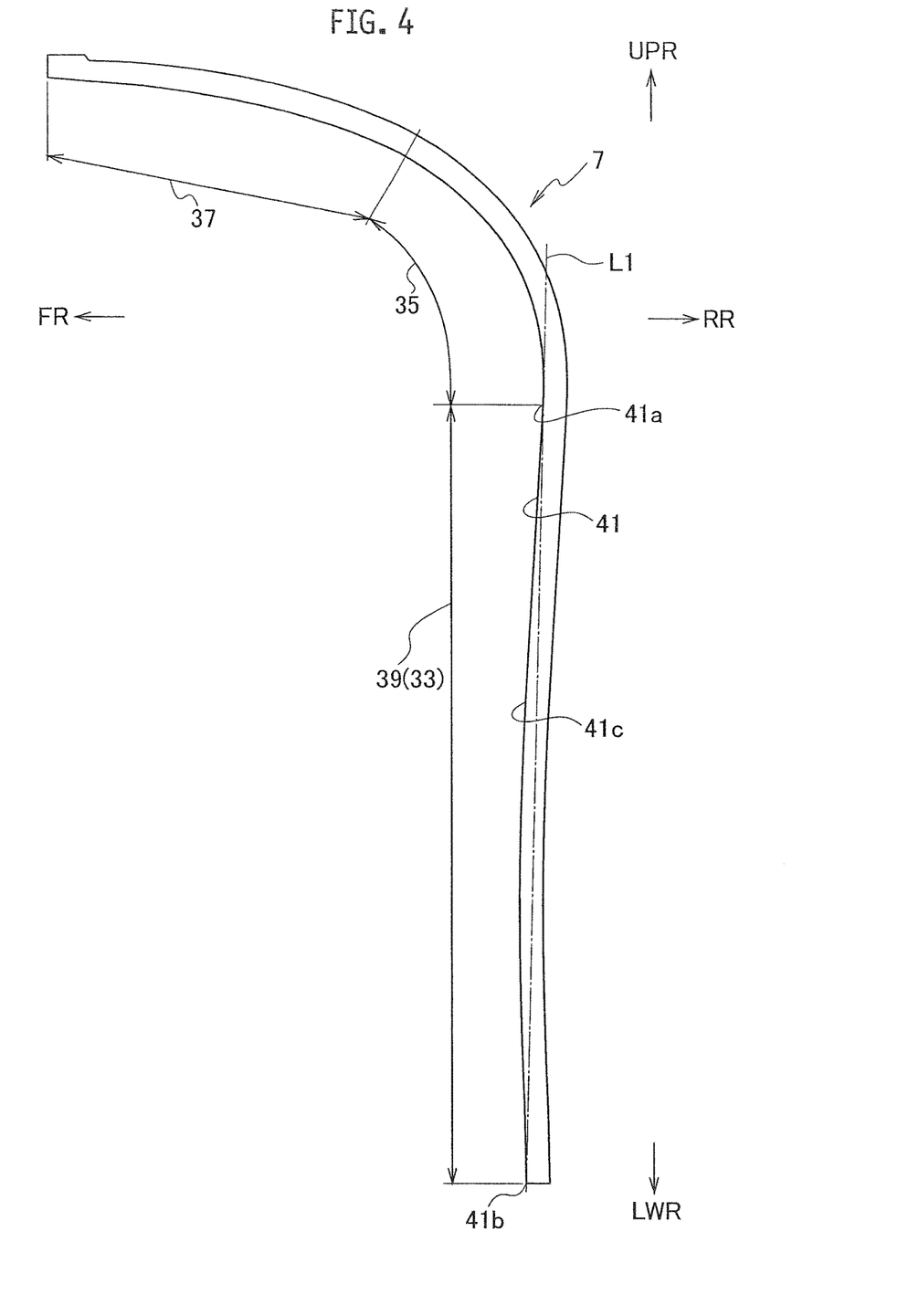
FIG. 4 is an enlarged cross-sectional view of a partition panel according to the first embodiment without hatching.

As shown in FIG. 4, the partition panel 7 is formed such that the thickness thereof remains substantially the same over the entire area, and is formed in an inverted L-shape in a side view integrally by a main body section 33 disposed on the lower side, a bending section 35 disposed on top of the main body section 33 and bending in an arc shape toward the vehicle front side, and an extending section 37 extending from the bending section 35 toward the vehicle front side.

The main body section 33 is formed as a bulging section 39 bulging toward the vehicle front side. Specifically, a vertical center portion 41c of a front surface 41 of the bulging section 39 is disposed on the vehicle front side of a straight line L1, the straight line L1 being a line indicated by a chain line and connecting an upper edge 41a and a lower edge 41b of the front surface 41 of the bulging section 39. In other words, on the front surface 41 of the bulging section 39, the vertical center portion 41c is disposed on the vehicle front side of the upper edge 41a and the lower edge 41b. Thus, the front surface 41 of the bulging section 39 is gently curved such that the front surface 41 becomes closer to the vehicle front side as extending toward the vertical center portion 41c. Moreover, the center of curvature of the front surface 41 of the bulging section 39 of the entire area of the front surface 41 is situated on the vehicle rear side of the front surface 41.

Figure 5:
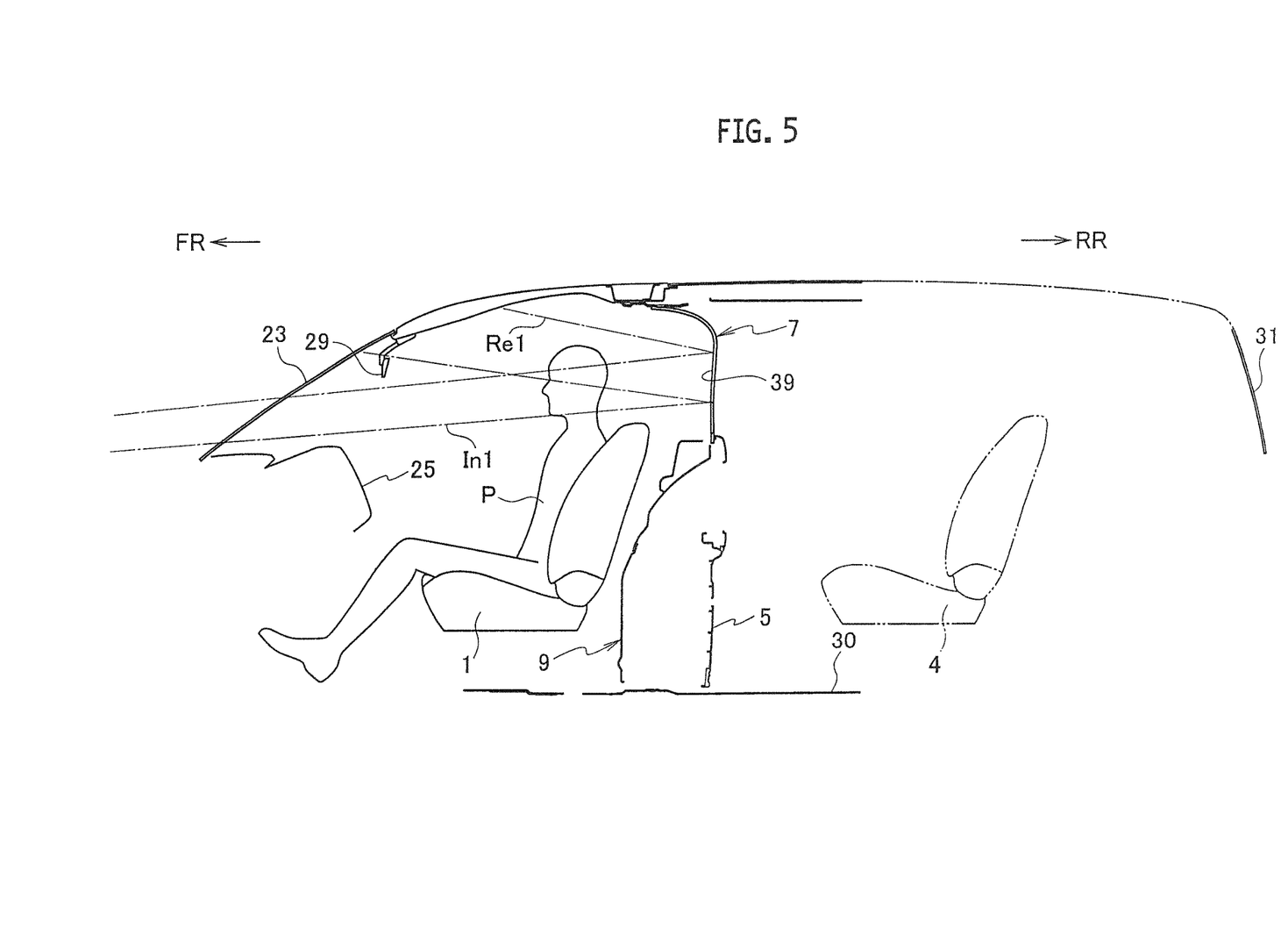
FIG. 5 is a schematic side view showing incoming light from the front and reflected light as the incoming light reflected on a bulging section of the partition panel toward the front.

As shown in FIG. 5, incoming light In1 (e.g. light from the tail lamp of a vehicle ahead) coming in through the front windshield 23 from the vehicle front side strikes the bulging section 39 of the partition panel 7 and is reflected toward the front. Here, this reflected light Re1 is scattered by the bulging section 39 in such a way as to spread in the vertical direction. Accordingly, the intensity of the reflected light Re1 which appears on the rear-view mirror 29 is reduced.

Note that in the first embodiment, the height of the upper edge 41a of the front surface 41 of the bulging section 39 is set to be substantially equal to the height of the top of the head of the driver P sitting in the driver's seat 1. Moreover, according to one or more embodiments of the present invention, the upper edge 41a and the lower edge 41b of the front surface 41 of the bulging section 39 are disposed outside the range of vision of the driver P sitting in the driver's seat 1 through the rear-view mirror 29, so as to ensure that the reflected light Re1 appearing on the rear-view mirror 29 is a spread light.

Meanwhile, the shape of the bulging section 39 according to this the first embodiment has been described as a shape bulging toward the vehicle front side in a vertical cross section taken along the vertical direction. However, a shape may be employed which bulges toward the vehicle front side in a cross section taken along the vehicle width direction. Specifically, a bulging section may be employed whose center portion in the vehicle width direction is disposed in such a way as to protrude toward the vehicle front side from both end portions in the vehicle width direction, so that incoming light is scattered by the bulging section in such a way as to spread in the left-right direction. In this case, too, according to one or more embodiments of the present invention, both edges of the bulging section in the vehicle width direction are disposed outside the range of vision of the driver P sitting in the driver's seat 1 through the rear-view mirror 29, so as to ensure that the reflected light Re1 appearing on the rear-view mirror 29 is a spread light.

Hereinbelow, one or more embodiments that may be achieved by the first embodiment will be described.

(1) The vehicle interior structure according to the first embodiment is a vehicle interior structure in which the partition panel 7 is arranged along the vehicle width direction between the driver's seat 1 disposed inside the cabin and the rear passenger's seats 4 disposed on the vehicle rear side of the driver's seat 1. The partition panel 7 includes the bulging section 39 bulging toward the vehicle front side.

Thus, the incoming light In1 coming in from the vehicle front side is reflected on the bulging section 39 of the partition panel 7, and this reflected light Re1 spreads in the vertical direction when traveling toward the vehicle front side. This reduces the intensity of the reflected light Re1 which is reflected on the bulging section 39 and appears on the rear-view mirror 29. Accordingly, the feeling of disturbance the driver P experiences can be reduced.

Second Embodiment

Next, a second embodiment of the present invention will be described. Note that the same structural features as the first embodiment are denoted by the same reference signs and description thereof is omitted.

Figure 6:
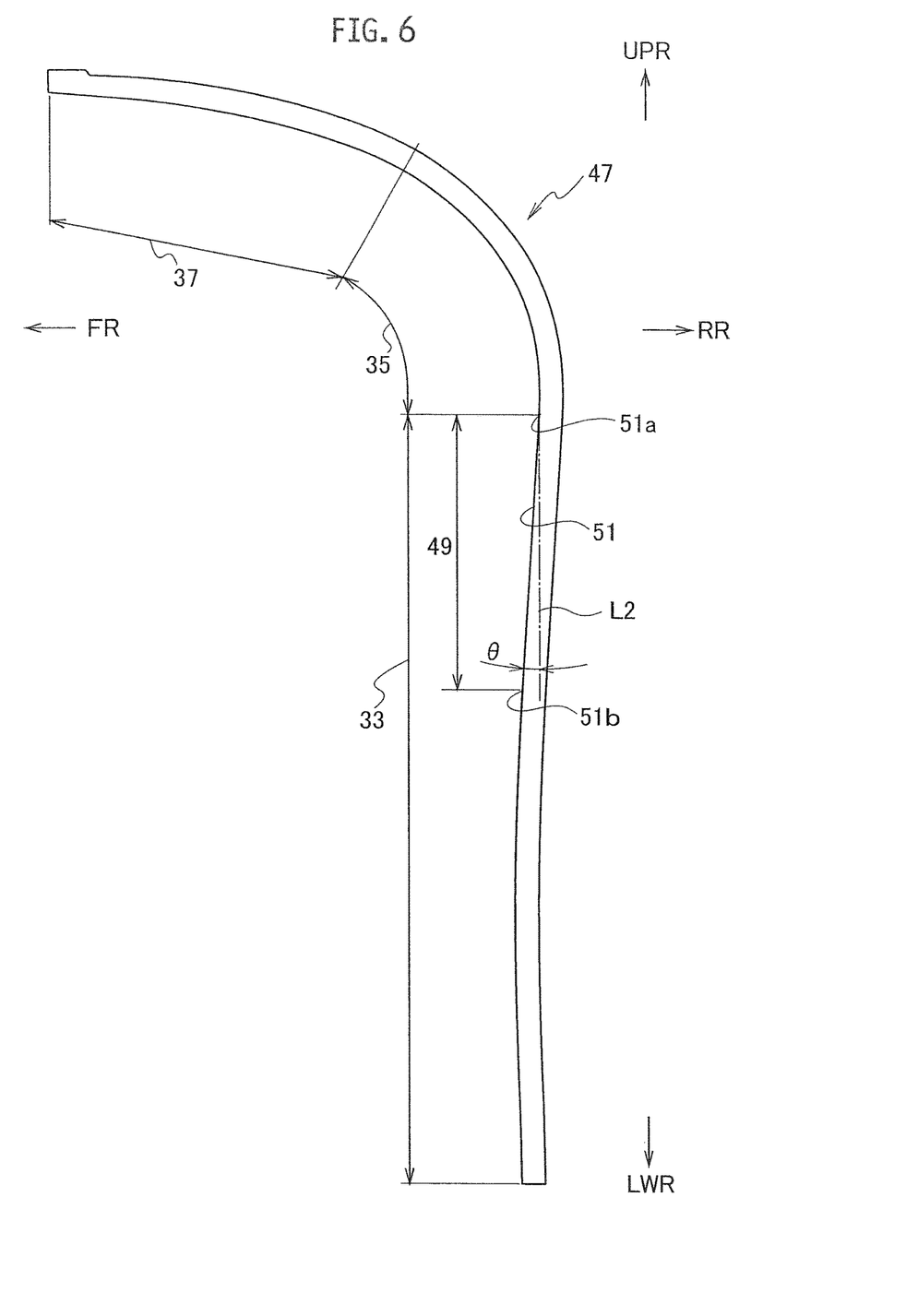
FIG. 6 is an enlarged cross-sectional view of a partition panel according to a second embodiment of the present invention without hatching.

As shown in FIG. 6, like the first embodiment, a partition panel 47 according to the second embodiment is formed such that the thickness thereof remains substantially the same over the entire area, and is formed in an inverted L-shape in a side view integrally by a main body section 33 disposed on the lower side, a bending section 35 disposed on top of the main body section 33 and bending in an arc shape toward the vehicle front side, and an extending section 37 extending from the bending section 35 toward the vehicle front side.

The main body section 33 includes an inclining portion 49 inclining with respect to the vehicle vertical direction such that the inclining portion 49 becomes closer to the vehicle front side as extending downward. Specifically, a front surface 51 of the inclining portion 49 inclines toward the vehicle front side by a predetermined angle $\theta$ with respect to a vertical line L2 which extends downward from an upper edge 51a of the front surface 51 of the inclining portion 49. In other words, on the front surface 51 of the inclining portion 49, a lower edge 51b is disposed on the vehicle front side of the upper edge 51a.

Figure 7:
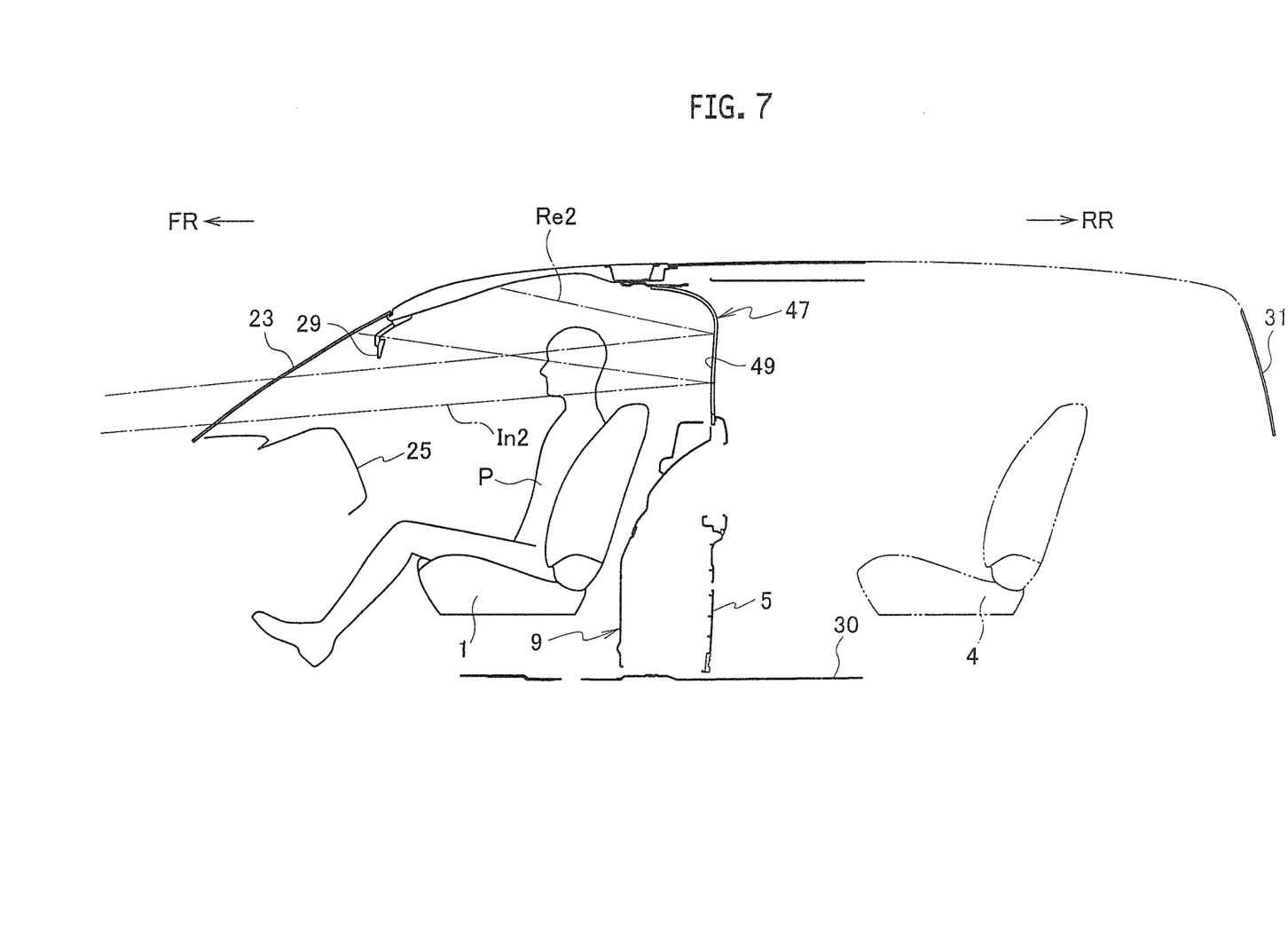
FIG. 7 is a schematic side view showing incoming light from the front and reflected light as the incoming light reflected on an inclining portion of the partition panel toward the front.

As shown in FIG. 7, incoming light In2 (e.g. light from the tail lamp of a vehicle ahead) comes in through a front windshield 23 from the vehicle front side. The incoming light In2 in a range to strike the inclining portion 49 of the partition panel 47 shifts slightly upward in a side view as traveling toward the rear. Thereafter, the incoming light In2 in the range to strike the inclining portion 49 of the partition panel 47 is reflected on the inclining portion 49 toward the front. Here, the inclining portion 49 makes this reflected light Re2 incline upward as traveling toward the front, thereby increasing the likelihood of the reflected light Re2 from the inclining portion 49 missing a rear-view mirror 29 to the upper side.

Note that, according to one or more embodiments of the present invention, the lower edge 51b of the front surface 51 of the inclining portion 49 is disposed lower than the range which the incoming light In2 coming in through the front windshield 23 strikes. Moreover, according to one or more embodiments of the present invention, the upper edge 51a of the front surface 51 of the inclining portion 49 is disposed outside the range of vision of a driver P sitting in a driver's seat 1 through the rear-view mirror 29. The size of the angle θ is not particularly limited but, according to one or more embodiments of the present invention, is set such that, in the case where the incoming light In2 horizontally comes in through the front windshield 23, the reflected light Re2 reflected from a lower end portion of the range the incoming light In2 strikes misses the rear-view mirror 29 to the upper side. In this way, it is possible to increase the likelihood of the reflected light Re2 missing the rear-view mirror 29 to the upper side.

Hereinbelow, one or more advantages that may be achieved by the second embodiment will be described.

(1) The vehicle interior structure according to the second embodiment is a vehicle interior structure in which the partition panel 47 is arranged along the vehicle width direction between the driver's seat 1 disposed inside the cabin and rear passenger's seats 4 disposed on the vehicle rear side of the driver's seat 1. The partition panel 47 includes the inclining portion 49 inclining with respect to the vehicle vertical direction such that the inclining portion 49 becomes closer to the vehicle front side as extending downward.

Since the partition panel 47 includes the inclining portion 49 as described above, the likelihood of the reflected light Re2 from the inclining portion 49 missing the rear-view mirror 29 to the upper side is increased. Even if the reflected light Re2 is incident on the rear-view mirror 29, the reflected light thereof is likely to miss the height position of the eyes of the driver P to the upper side. Accordingly, the feeling of disturbance the driver P experiences can be reduced.

Embodiments of the present invention are described above, but the embodiments are mere examples illustrated for the purpose of facilitating understanding of the present invention, and the present invention is not limited to the above embodiments. The technical scope of the present invention is not limited to the specific technical matters disclosed in the above embodiments, but encompasses various modifications, changes, alternative techniques, and the like derived therefrom.

According to one or more embodiments of the present invention, light coming in from the vehicle front side is reflected on the bulging section of the partition panel, and this reflected light spreads in at least one of the vertical direction and the left-right direction when traveling toward the vehicle front side. This reduces the intensity of the reflected light which is reflected on the bulging section and appears on the rear-view mirror. Accordingly, the feeling of disturbance the driver P experiences can be reduced.

Moreover, according to one or more embodiments of the present invention, the partition panel includes the inclining portion, which increases the likelihood of reflected light from the inclining portion missing the rear-view mirror to the upper side. Even if the reflected light is incident on the rear-view mirror, the reflected light thereof is likely to miss the height position of the eyes of the driver to the upper side. Accordingly, the feeling of disturbance the driver experiences can be reduced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 driver's seat
4 rear passenger's seat
7 partition panel
39 bulging section
47 partition panel
49 inclining portion

The invention claimed is:
1. A vehicle interior structure comprising:
a driver's seat disposed inside a cabin;
a rear passenger's seat disposed rearward of the driver's seat inside the cabin; and
a partition panel arranged along a vehicle width direction between the driver's seat and the rear passenger's seat,
wherein the partition panel comprising a bulging section bulging forward and having a front surface disposed forward of a straight line passing through upper and lower edges of the front surface.
2. The vehicle interior structure according to claim 1, wherein the partition panel includes an inclining portion inclining with respect to a vehicle vertical direction such that a lower part of the inclining portion is located forward of an upper part of the inclining portion.

* * * * *